United States Patent
Na et al.

(10) Patent No.: US 10,843,432 B2
(45) Date of Patent: Nov. 24, 2020

(54) MULTILAYER WATER PIPE FOR MINING OPERATIONS

(71) Applicant: SABIC GLOBAL TECHNOLOGIES B.V., Bergen op Zoom (NL)

(72) Inventors: Ying Na, Shanghai (CN); Guangtao Chen, Shanghai (CN); Yonglei Xu, Shanghai (CN); Haiyang Gan, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/631,516

(22) PCT Filed: Jul. 17, 2018

(86) PCT No.: PCT/IB2018/055299
§ 371 (c)(1),
(2) Date: Jan. 16, 2020

(87) PCT Pub. No.: WO2019/016702
PCT Pub. Date: Jan. 24, 2019

(65) Prior Publication Data
US 2020/0200298 A1 Jun. 25, 2020

Related U.S. Application Data

(60) Provisional application No. 62/533,795, filed on Jul. 18, 2017.

(51) Int. Cl.
*B32B 1/08* (2006.01)
*F16L 9/12* (2006.01)
(Continued)

(52) U.S. Cl.
CPC ............. *B32B 1/08* (2013.01); *B32B 27/08* (2013.01); *B32B 27/18* (2013.01); *B32B 27/20* (2013.01);
(Continued)

(58) Field of Classification Search
CPC .......... B32B 1/08; B32B 27/18; B32B 27/20; B32B 27/28; B32B 27/285; B32B 27/32;
(Continued)

(56) References Cited

U.S. PATENT DOCUMENTS

| | | |
|---|---|---|
| 4,213,486 A | 7/1980 | Samour et al. |
| 5,258,213 A | 11/1993 | Mugge et al. |

(Continued)

FOREIGN PATENT DOCUMENTS

| | | |
|---|---|---|
| CN | 101797821 A | 8/2010 |
| CN | 103172920 A | 6/2013 |

(Continued)

OTHER PUBLICATIONS

International Search Report for the corresponding International Application No. PCT/IB2018/055299; International Filing Date: Jul. 17, 2018; dated Oct. 22, 2018; 8 pages.
(Continued)

*Primary Examiner* — Walter Aughenbaugh
(74) *Attorney, Agent, or Firm* — Cantor Colburn LLP

(57) ABSTRACT

A multilayer water pipe for mining operations has an outer layer and an inner layer. The inner layer of the multilayer water pipe includes a composition containing a poly(phenylene ether), a hydrogenated block copolymer of an alkenyl aromatic monomer and a conjugated diene, optionally, a homopolystyrene, a rubber-modified polystyrene, or a combination comprising at least one of the foregoing, and a flame retardant comprising an organophosphate ester. The outer layer of the multilayer water pipe includes a compo-
(Continued)

sition containing a high density polyethylene, an antistatic agent, a flame retardant, and a flame retardant synergist. The multilayer water pipe exhibits a desirable balance of impact strength, tensile strength, burst pressure resistance, static pressure resistance, flame retardancy, and outer surface electrical resistance.

20 Claims, 1 Drawing Sheet

(51) Int. Cl.

| | |
|---|---|
| B29C 48/21 | (2019.01) |
| B32B 27/08 | (2006.01) |
| B32B 27/28 | (2006.01) |
| B32B 27/32 | (2006.01) |
| C08K 5/00 | (2006.01) |
| C08L 71/12 | (2006.01) |
| F16L 9/133 | (2006.01) |
| B32B 27/18 | (2006.01) |
| B32B 27/20 | (2006.01) |
| B29C 48/09 | (2019.01) |
| B29K 23/00 | (2006.01) |
| B29L 23/00 | (2006.01) |

(52) U.S. Cl.
CPC ............ *B32B 27/28* (2013.01); *B32B 27/285* (2013.01); *B32B 27/32* (2013.01); *B32B 27/327* (2013.01); *C08K 5/0066* (2013.01); *C08K 5/0075* (2013.01); *C08L 71/123* (2013.01); *F16L 9/12* (2013.01); *F16L 9/133* (2013.01); *B29C 48/09* (2019.02); *B29C 48/21* (2019.02); *B29K 2023/065* (2013.01); *B29K 2065/00* (2013.01); *B29L 2023/22* (2013.01); *B32B 2250/02* (2013.01); *B32B 2250/24* (2013.01); *C08L 2203/18* (2013.01)

(58) Field of Classification Search
CPC .......... B32B 27/327; F16L 9/12; F16L 9/133; B29C 48/09; B29C 48/21
See application file for complete search history.

(56) References Cited

U.S. PATENT DOCUMENTS

| | | | |
|---|---|---|---|
| 5,560,398 | A | 10/1996 | Pfleger |
| 5,588,468 | A | 12/1996 | Pfleger |
| 5,792,532 | A | 8/1998 | Pfleger |
| 6,706,350 | B2 | 3/2004 | Sato et al. |
| 6,841,215 | B2 | 1/2005 | Kitamura et al. |
| 7,025,918 | B1 | 4/2006 | Percec et al. |
| 7,517,927 | B2 | 4/2009 | Kosaka et al. |
| 8,017,697 | B2 | 12/2011 | Carrillo et al. |
| 8,563,131 | B2 | 10/2013 | Mhetar et al. |
| 8,669,332 | B2 | 3/2014 | Carrillo et al. |
| 8,993,660 | B2 | 3/2015 | Minder et al. |
| 9,151,418 | B2 | 10/2015 | Goering et al. |
| 10,213,980 | B2 * | 2/2019 | Koevoets ................ B32B 27/20 |
| 10,584,809 | B2 * | 3/2020 | Chen ........................ F16L 9/12 |
| 2005/0217747 | A1 | 10/2005 | Buriak et al. |
| 2012/0061120 | A1 | 3/2012 | Harada et al. |
| 2013/0032240 | A1 | 2/2013 | Kuhmann et al. |

FOREIGN PATENT DOCUMENTS

| | | |
|---|---|---|
| CN | 106467629 A | 3/2017 |
| DE | 3704053 A1 | 8/1988 |
| EP | 0413972 A2 | 2/1991 |
| PL | 217104 A1 | 2/1981 |
| WO | 2016142803 A1 | 9/2016 |
| WO | 2017063161 A1 | 4/2017 |

OTHER PUBLICATIONS

Written Opinion for the corresponding International Application No. PCT/IB2018/055299; International Filing Date: Jul. 17, 2018; dated Oct. 22, 2018; 7 pages.

* cited by examiner

MULTILAYER WATER PIPE FOR MINING OPERATIONS

CROSS-REFERENCE TO RELATED APPLICATIONS

This application is a National Stage application of PCT/IB2018/055299, filed Jul. 17, 2018, which claims benefit of U.S. Provisional Application No. 62/533,795 filed on Jul. 18, 2017, both of which are incorporated by reference herein in their entirety.

BACKGROUND

In the mining industry, metal pipes are commonly used for the delivery of water. Metal pipes have the disadvantages of high weight, susceptibility to corrosion, and the potential to create sparks. As alternative to metal pipes, pipes made from various plastics have been employed. All plastic pipes benefit from reduced weight, reduced corrosion, and reduced sparking relative to metal pipes. However, plastic pipes have other disadvantages. Pipes made from poly(vinyl chloride) (PVC) are relatively brittle, and can break on impact. Pipes made from high density polyethylene (HDPE) and polypropylene (PP) exhibit good toughness (low brittleness), but they can withstand only relatively low burst pressure and static pressure. Ultrahigh molecular weight polyethylene pipes are difficult to extrude.

There remains a need for a mining industry water pipe that exhibits an improved balance of impact strength, tensile strength, burst pressure resistance, static pressure resistance, flame retardancy, and outer surface electrical resistance.

BRIEF DESCRIPTION

A multilayer water pipe for mining operations has an inner layer and an outer layer, wherein the inner layer comprises an inner layer composition comprising: 58 to 82 parts by weight poly(phenylene ether), 8 to 18 parts by weight of a hydrogenated block copolymer of an alkenyl aromatic monomer and a conjugated diene, 0 to 15 parts by weight of a homopolystyrene, rubber-modified polystyrene, or a combination comprising at least one of the foregoing, and 10 to 20 parts by weight of a flame retardant comprising an organophosphate ester, wherein parts by weight values of the inner layer composition are based on 100 parts by weight total of the poly(phenylene ether), the hydrogenated block copolymer, the polystyrene, and the flame retardant, and the outer layer comprises an outer layer composition comprising: 60 to 92 parts by weight of a high density polyethylene; 2 to 15 parts by weight of an antistatic agent; 5 to 15 parts by weight of a flame retardant; and 1 to 4 parts by weight of a flame retardant synergist; wherein parts by weight values of the outer layers composition are based on 100 parts by weight total of the high density polyethylene, the antistatic agent, the flame retardant, and the flame retardant synergist.

A multilayer water pipe for mining operations has an inner layer and an outer layer, wherein the multilayer water pipe has an outer diameter of 20 to 200 millimeters and a total wall thickness of 1.51 to 22 millimeters; the inner layer has a wall thickness of 1.5 to 20 millimeters and the outer layer has a wall thickness of 0.01 to 2 millimeters, preferably wherein the inner layer has a wall thickness of 1.5 to 10 millimeters and the outer layer has a wall thickness of 0.02 to 0.2 millimeters; the inner layer comprises an inner layer composition comprising: 58 to 82 parts by weight, preferably 65 to 75 parts by weight poly(phenylene ether), 8 to 18 parts by weight, preferably 12 to 16 parts by weight of a hydrogenated block copolymer of an alkenyl aromatic monomer and a conjugated diene, 0 to 15 parts by weight, preferably 1 to 15 parts by weight of a homopolystyrene, rubber-modified polystyrene, or a combination comprising at least one of the foregoing, and 10 to 20 parts by weight of a flame retardant comprising an organophosphate ester, wherein parts by weight values of the inner layer composition are based on 100 parts by weight total of the poly(phenylene ether), the hydrogenated block copolymer, the polystyrene, and the flame retardant, and the outer layer comprises an outer layer composition comprising: 60 to 92 parts by weight of a high density polyethylene; 2 to 15 parts by weight of an antistatic agent; 5 to 15 parts by weight of a flame retardant; and 1 to 4 parts by weight of a flame retardant synergist; wherein parts by weight values of the outer layers composition are based on 100 parts by weight total of the high density polyethylene, the antistatic agent, the flame retardant, and the flame retardant synergist.

A method of manufacturing the multilayer water pipe, the method comprising: forming an inner layer composition by melt-mixing 58 to 82 parts by weight poly(phenylene ether), 8 to 18 parts by weight of a hydrogenated block copolymer of an alkenyl aromatic monomer and a conjugated diene, 0 to 15 parts by weight of a homopolystyrene, rubber-modified polystyrene, or a combination comprising at least one of the foregoing, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant; extruding the composition through an annular die to provide a single layer pipe comprising the inner layer composition; forming an outer layer composition by melt-mixing 60 to 92 parts by weight of a high density polyethylene; 2 to 15 parts by weight of an antistatic agent; 5 to 15 parts by weight of a flame retardant; and 1 to 4 parts by weight of a flame retardant synergist; wherein parts by weight values of the outer layers composition are based on 100 parts by weight total of the high density polyethylene, the antistatic agent, the flame retardant, and the flame retardant synergist; and coating the single layer pipe with the outer layer composition to provide the multilayer pipe.

A method of manufacturing the multilayer water pipe, the method comprising: coextruding an outer layer, annular in cross-section and characterized by a first outer diameter, a first inner diameter and a first wall thickness; wherein the outer layer comprises an outer layer composition comprising, based on 100 parts by weight total of the high density polyethylene, the antistatic agent, the flame retardant, and the flame retardant synergist, 60 to 92 parts by weight of a high density polyethylene; 2 to 15 parts by weight of an antistatic agent; 5 to 15 parts by weight of a flame retardant; and 1 to 4 parts by weight of a flame retardant synergist; and an inner layer, annular in cross-section and characterized by a second outer diameter less than the first inner diameter, a second inner diameter, and a second wall thickness; wherein the inner layer comprises an inner layer composition comprising, based on 100 parts by weight total of the poly(phenylene ether), the hydrogenated block copolymer, the polystyrene, and the flame retardant, 58 to 82 parts by weight poly(phenylene ether); 8 to 18 parts by weight of a hydrogenated block copolymer of an alkenyl aromatic monomer and a conjugated diene; 0 to 15 parts by weight of a homopolystyrene, rubber-modified polystyrene, or a combination comprising at least one of the foregoing; and 10 to 20 parts by weight of a flame retardant comprising an organophosphate ester.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

Figure 1:
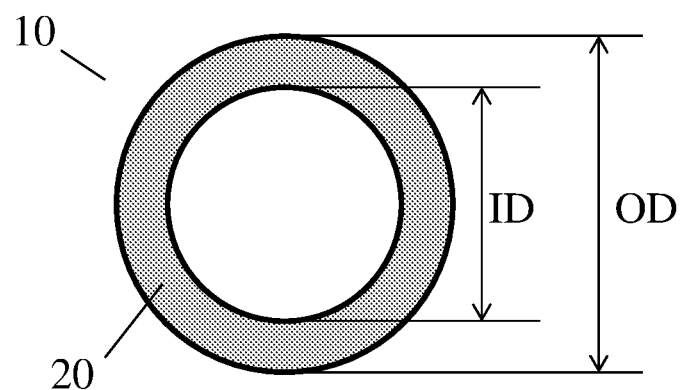
FIG. 1 shows a cross-sectional view of a single layer pipe 10 for mining operations, having a pipe wall 20.

The present inventors have determined that an improved balance of impact strength, tensile strength, burst pressure resistance, static pressure resistance, flame retardancy, and outer surface electrical resistance is provided by a multilayer water pipe where each layer of the pipe has a specific composition.

Accordingly, a multilayer water pipe for mining operations represents an aspect of the present disclosure. The multilayer water pipe has an inner layer and an outer layer. The inner layer of the water pipe comprises an inner layer composition comprising a poly(phenylene ether) composition.

The inner layer composition comprises a poly(phenylene ether). Poly(phenylene ether)s include those comprising repeating structural units having the formula

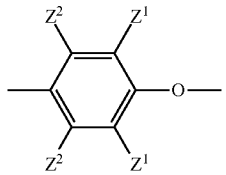

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

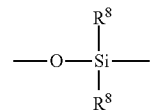

wherein each occurrence of $R^8$ is independently hydrogen, $C_1$-$C_{12}$ hydrocarbyl or $C_1$-$C_{12}$ halohydrocarbyl; and two terminal units having the structure

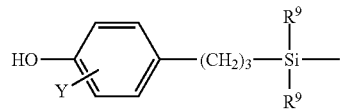

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl, or $C_1$-$C_{12}$ halohydrocarbyl. In a very specific embodiment, each occurrence of $R^8$ and $R^9$ is methyl, and Y is methoxy.

In some embodiments, the monohydric phenol comprises 2,6-dimethylphenol, and the hydroxyaryl-terminated polysiloxane has the structure

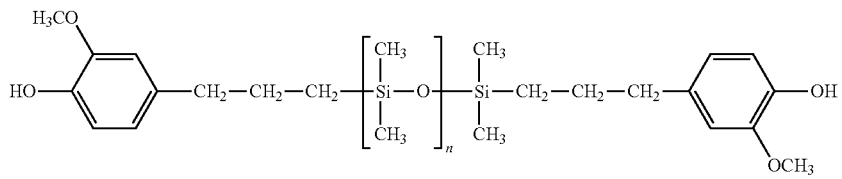

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, more specifically 0.3 to 0.6, more specifically 0.35 to 0.5 deciliter per gram, even more specifically 0.4 to 0.5 deciliter per gram.

In some embodiments, the poly(phenylene ether) comprises a homopolymer or copolymer of 2,6-dimethylphenol, 2,3,6-trimethylphenol, or a combination comprising at least one of the foregoing. In some embodiments, the poly(phenylene ether) comprises a poly(2,6-dimethyl-1,4-phenylene ether) having an intrinsic viscosity of 0.4 to 0.5 deciliter per gram, determined by Ubbelohde viscometer at 25° C. in chloroform.

In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, specifically 0.1 to 1 weight percent, more specifically 0.2 to 0.8 weight percent, of siloxane groups to the composition as a whole.

The inner layer composition comprises the poly(phenylene ether) in an amount of 58 to 82 parts by weight, based on 100 parts by weight total of the poly(phenylene ether), the hydrogenated block copolymer, the polystyrene, and the flame retardant. Within this range, the poly(phenylene ether) amount can be 60 to 80 parts by weight, specifically 65 to 78 parts by weight, more specifically 70 to 78 parts by weight.

In addition to the poly(phenylene ether), the inner layer composition comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 weight percent, specifically 20 to 35 weight percent, more specifically 25 to 35 weight percent, yet more specifically 30 to 35 weight percent, all based on the weight of the low poly(alkenyl aromatic) content hydrogenated block copolymer. In other embodiments, the hydrogenated block copolymer is a high poly(alkenyl aromatic content) hydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic content) hydrogenated block copolymer.

In some embodiments, the hydrogenated block copolymer has a weight average molecular weight of 40,000 to 400,000 Daltons. The number average molecular weight and the weight average molecular weight can be determined by gel permeation chromatography based on comparison to polystyrene standards. In some embodiments, the hydrogenated block copolymer has a weight average molecular weight of 200,000 to 400,000 Daltons, specifically 220,000 to 350,000 Daltons. In other embodiments, the hydrogenated block copolymer has a weight average molecular weight of 40,000 to 200,000 Daltons, specifically 40,000 to 180,000 Daltons, more specifically 40,000 to 150,000 Daltons.

The alkenyl aromatic monomer used to prepare the hydrogenated block copolymer can have the structure

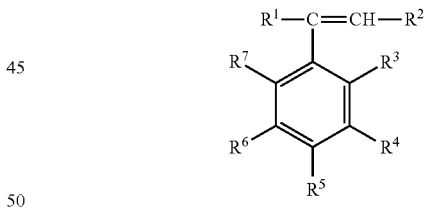

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, or a combination comprising at least one of the foregoing. In some embodiments, the conjugated diene is 1,3-butadiene, 2-methyl-1,3-butadiene, or a combination comprising at least one of the foregoing. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination comprising at least one of the foregoing.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride. In some embodiments, the hydrogenated block copolymer comprises a polystyrene-poly(ethylene-butylene)-polystyrene triblock copolymer.

In some embodiments, the hydrogenated block copolymer is a polystyrene-poly(ethylene-propylene)-polystyrene triblock copolymer having a polystyrene content of 20 to 45 weight percent, or 20 to 40 weight percent, or 25 to 35 weight percent, based on the weight of the polystyrene-poly(ethylene-propylene)-polystyrene triblock copolymer. In these embodiments, the polystyrene-poly(ethylene-propylene)-polystyrene triblock copolymer can, optionally, have a weight average molecular weight of 240,000 to 300,000 Daltons, determined by size exclusion chromatography using polystyrene standards.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene); and from Kuraray as SEPTON™ 8006 (having about 33 weight percent polystyrene) and 8007 (having about 30 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc. as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two of more hydrogenated block copolymers can be used. In some embodiments, the hydrogenated block copolymer comprises a polystyrene poly(ethylene-butylene)-polystyrene triblock copolymer having a weight average molecular weight of at least 100,000 Daltons, specifically 200,000 to 400,000 Daltons.

The inner layer composition comprises a hydrogenated block copolymer in an amount of 8 to 18 parts by weight, based on 100 parts by weight total of the poly(phenylene ether), the hydrogenated block copolymer, the polystyrene, and the flame retardant. Within this range, the hydrogenated block copolymer amount can be 9 to 18 parts by weight, specifically 10 to 16 parts by weight.

In addition to the poly(phenylene ether) and the hydrogenated block copolymer, the inner layer composition optionally comprises a homopolystyrene, rubber-modified polystyrene, rubber-modified polystyrenes, or a combination comprising at least one of the foregoing.

As used herein, the term homopolystyrene refers to a homopolymer of styrene. Thus, the residue of any monomer other than styrene is excluded from the homopolystyrene. The homopolystyrene can be atactic, syndiotactic, or isotactic. In some embodiments, the homopolystyrene consists of atactic homopolystyrene. In some embodiments, the homopolystyrene has a melt flow rate of 5 to 12 grams per 10 minutes, measured at 200° C. and 5 kilogram load according to ASTM D 1238-13.

Rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene.

The inner layer composition comprises the polystyrene in an amount of 0 to 15 parts by weight, based on 100 parts by weight total of the poly(phenylene ether), the hydrogenated block copolymer, the polystyrene, and the flame retardant. In some embodiments, the polystyrene amount is 0 to 13 parts by weight, specifically 0 to 10 parts by weight, more specifically 0 to 5 parts by weight. In some embodiments, the inner layer composition excludes the polystyrene.

In some embodiments, wherein the inner layer composition comprises 1 to 15 parts by weight of the polystyrene. In some of these embodiments, the polystyrene consists of the homopolystyrene. In others of these embodiments, polystyrene consists of the rubber-modified polystyrene.

In some embodiments, the inner layer composition excludes the polystyrene.

In addition to the poly(phenylene ether), the hydrogenated block copolymer, and the optional polystyrene, the inner layer composition comprises a flame retardant comprising an organophosphate ester.

Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is a tris (alkylphenyl) phosphate (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphate (CAS Reg. No. 78-33-1), or a combination comprising at least one of the foregoing.

In some embodiments the organophosphate ester comprises a bis-aryl phosphate having the formula

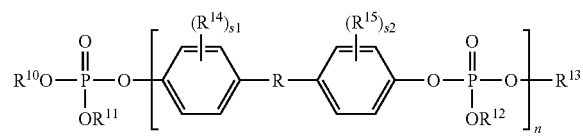

wherein R is independently at each occurrence a $C_1$-$C_{12}$ alkylene group; $R^{14}$ and $R^{15}$ are independently at each occurrence a $C_1$-$C_5$ alkyl group; $R^{10}$, $R^{11}$, and $R^{12}$ are independently a $C_1$-$C_{12}$ hydrocarbyl group; $R^{10}$ is independently at each occurrence a $C_1$-$C_{12}$ hydrocarbyl group; n is 1 to 25; and s1 and s2 are independently an integer equal to 0, 1, or 2. In some embodiments $OR^{10}$, $OR^{11}$, $OR^{12}$, and $OR^{13}$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

In some embodiments, the flame retardant consists of the organophosphate ester. In other embodiments, the flame retardant further comprises one or more of a metal di ($C_{1-12}$)alkylphosphinate (such as aluminum tris(diethylphosphinate)), a linear or cyclic bis(phenoxy)phosphazene, melamine phosphate, melamine pyrophosphate, melamine polyphosphate, melamine cyanurate, and metal hydroxides (such as magnesium hydroxide, aluminum hydroxide, and cobalt hydroxide).

The inner layer composition comprises the flame retardant in an amount of 10 to 20 parts by weight, based on 100 parts by weight total of the poly(phenylene ether), the hydrogenated block copolymer, the polystyrene, and the flame retardant. Within this range, the flame retardant amount can be 10 to 18 parts by weight, specifically 11 to 16 parts by weight.

The inner layer composition can, optionally, further comprise a stabilizer, lubricant, processing aid, drip retardant, UV blocker, dye, pigment, antioxidant, anti-static agent, mineral oil, metal deactivator, or a combination comprising at least one of the foregoing. The inner layer composition comprises the additive in an amount of 0 to 5 parts by weight, based on 100 parts by weight total of the poly (phenylene ether), the hydrogenated block copolymer, the polystyrene, and the flame retardant.

Components not described herein a required can be minimized or excluded from the inner layer composition. For example, in some embodiments, the inner layer composition comprises 0 to 2 weight percent of polyamides, and in some embodiments the inner layer composition excludes polyamides. As another example, in some embodiments, the inner layer composition comprises 0 to 2 weight percent of polyolefins, and in some embodiments the inner layer composition excludes polyolefins. As another example, in some embodiments, the inner layer composition comprises 0 to 2 weight percent of polyesters, and in some embodiments the inner layer composition excludes polyesters. As another example, in some embodiments the inner layer composition comprises 0 to 2 weight percent of unhydrogenated block copolymers of alkenyl aromatic monomers and conjugated dienes, and in some embodiment the inner layer composition excludes such unhydrogenated block copolymers.

In a very specific embodiment, the inner layer composition consists of 58 to 82 parts by weight poly(phenylene ether), 8 to 18 parts by weight of the hydrogenated block copolymer, 0 to 15 parts by weight of a homopolystyrene, rubber-modified polystyrene, or a combination comprising at least one of the foregoing, 10 to 20 parts by weight of the flame retardant, and 0 to 5 parts by weight of a stabilizer, lubricant, processing aid, drip retardant, UV blocker, dye, pigment, antioxidant, anti-static agent, mineral oil, metal deactivator, or a combination comprising at least one of the foregoing.

In another specific embodiment, the poly(phenylene ether) comprises a poly(2,6-dimethyl-1,4-phenylene ether) having an intrinsic viscosity of 0.4 to 0.5 deciliter per gram, determined by Ubbelohde viscometer at 25° C. in chloroform; the hydrogenated block copolymer is a polystyrene-poly(ethylene-propylene)-polystyrene triblock copolymer having a polystyrene content of 25 to 35 weight percent, based on the weight of the polystyrene-poly(ethylene-propylene)-polystyrene triblock copolymer, and wherein the polystyrene-poly(ethylene-propylene)-polystyrene triblock copolymer has a weight average molecular weight of 240,000 to 300,000 daltons, determined according to size exclusion chromatography using polystyrene standards; the flame retardant consists of the organophosphate ester, and wherein the organophosphate ester comprises bisphenol A bis(diphenyl phosphate); and the inner layer composition comprises 65 to 75 parts by weight of the poly(phenylene ether), 12 to 16 parts by weight of the hydrogenated block copolymer, 0 to 5 parts by weight of the polystyrene, and 12 to 16 parts by weight of the flame retardant.

The multilayer water pipe further comprises an outer layer composition. The outer layer composition is disposed on the outside of the inner layer of the water pipe and in contact with it.

The outer layer composition comprises 60 to 92 parts by weight of a high density polyethylene, based on 100 parts by weight total of the high density polyethylene, the antistatic agent, the flame retardant, and the flame retardant synergist. Within this range, the high density polyethylene content can be 65 to 90 parts by weight, or 70 to 85 parts by weight.

In addition to the high density polyethylene, the outer layer composition further comprises 2 to 15 parts by weight of an antistatic agent, based on 100 parts by weight total of the high density polyethylene, the antistatic agent, the flame retardant, and the flame retardant synergist. Within this range, the antistatic agent content can be 2 to 12 parts by weight, or 2 to 10 parts by weight, or 2 to 8 parts by weight, or 2 to 5 parts by weight, or 5 to 12 parts by weight, or 8 to 12 parts by weight. "Antistatic agent" as used herein refers to a component that can improve the conductive properties of the composition. The antistatic agent can comprise a conductive carbon black, carbon nanotubes, or a combination comprising at least one of the foregoing. In some embodiments, the antistatic agent preferably comprises conductive carbon black. Conductive carbon blacks that are capable of modifying the electrostatic properties of a thermoplastic resin can have an average particle size of less than 200 nanometers, or less than 100 nanometers, or less than 50 nanometers, for example 1 to 100 nanometers, or 5 to 100 nanometers, or 5 to 50 nanometers. Conductive carbon blacks can also have a surface are of greater than 100 square meter per gram ($m^2/g$), or greater than about 400 $m^2/g$, or greater than about 800 $m^2/g$. Conductive carbon blacks can also have a pore volume (dibutyl phthalate absorption) greater than 40 cubic centimeters per hundred grams ($cm^3/100$ g), or greater than about 100 $cm^3/100$ g, or greater than about 150 $cm^3/100$ g. Commercially available carbon blacks useful for the outer layer composition can be any conductive carbon black that is used in modifying the electrostatic discharge (ESD) properties of thermoplastic resins. Such carbon blacks are sold under a variety of trade names, including but not limited to S.C.F. (Super Conductive Furnace), E.C.F. (Electric Conductive Furnace), Ketjen Black EC (available from Akzo Co., Ltd.) or acetylene black.

In addition to the high density polyethylene and the antistatic agent, the outer layer composition further comprises 5 to 15 parts be weight of a flame retardant, based on 100 parts by weight total of the high density polyethylene, the antistatic agent, the flame retardant, and the flame retardant synergist. The flame retardant of the outer layer composition can be a halogenated flame retardant, specifically a brominated flame retardant. The brominated flame retardant can be a brominated organic compound including, for example, tetrabromophthalate esters, decabromodiphenyl oxide, tetrabromobenzoate esters, tetrabromobisphenol A, tetrabromobisphenol A ethers, poly(dibromostyrene), hexabromocyclodecane, decabromodiphenylethane, 2,4,6-tribromophenol, bis(2,4,6-tribromophenoxy)ethane, and a combination comprising at least one of the foregoing. In some embodiments, the outer layer flame retardant comprises decabromodiphenyl oxide.

Other flame retardants which can be used in the outer layer composition include phosphate esters, chloro($C_{1-12}$alkyl) phosphate esters, phosphonate esters, phosphinate esters, expandable graphite, metal oxides, hydrated metal oxides, ammonium salts, silicates, and a combination comprising at least one of the foregoing. Phosphate esters include triethyl phosphate, cresyl diphenyl phosphate, tricresyl phosphate, trixylyl phosphate, isopropylated triaryl phosphates, bisphenol A bis(diphenyl phosphate), resorcinol bis(diphenyl phosphate), and a combination thereof. Chloro ($C_{1-12}$alkyl) phosphate esters include tris(2-chloroisopropyl) phosphate, tris(1,3-dichloroisopropyl)phosphate, tris(2-chloroethyl)phosphate, and a combination thereof. Phosphonate esters include diethyl N,N-bis(2-hydroxyethyl) aminoethyl phosphonate. Phosphinate esters include aluminum diethyl phosphinate, zinc diethyl phosphinate, and a combination comprising at least one of the foregoing. Metal oxides include magnesium hydroxide, antimony trioxide, sodium antimonite, and a combination comprising at least one of the foregoing. Hydrated metal oxides include aluminum trihydrate, sodium deacaborate decahydrate, zinc borate hydrate, and a combination comprising at least one of the foregoing Ammonium salts include ammonium pentaborate, ammonium sulfate, ammonium bisulfate, ammonium chloride, and a combination comprising at least one of the foregoing. Silicates are solid compounds containing silicon atoms covalently bonded to four oxygen atoms to form tetrahedral $SiO_4$ repeat units. One or more oxygen atoms of the subunit can bridge to one or more metal atoms. Examples of silicates include the sodium exchange form of zeolite type A and the sodium exchange form of montmorillonite clay. In some embodiments, the above-described flame retardants can be excluded from the outer layer composition. Stated another way, in some embodiments, the flame retardant of the outer layer composition can consist of the brominated flame retardant.

In addition to the high density polyethylene, the anti-static agent, and the flame retardant, the outer layer composition further comprises 1 to 4 parts by weight of a flame retardant synergist, based on 100 parts by weight total of the high density polyethylene, the antistatic agent, the flame retardant, and the flame retardant synergist. The flame retardant synergist is preferably an inorganic flame retardant synergist, for example antimony-containing compounds. The use of such flame retardant synergists can enhance the flame retardant properties of halogenated flame retardants. Exemplary inorganic flame retardant synergists can include antimony trioxide, antimony pentoxide, and antimony trisulfide, preferably antimony trioxide.

The outer layer composition can, optionally, further comprise a stabilizer, lubricant, processing aid, drip retardant, UV blocker, dyes pigment, antioxidant, mineral oil, metal deactivator, coupling agent, or a combination comprising at least one of the foregoing, preferably an antioxidant and a coupling agent.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. In some embodiments, the antioxidant preferably comprises octadecyl-3-(3, 5-di-tert-butyl-4-hydroxyphenyl)propionate, tris(2,4-di-t-butylphenyl)phosphite, or a combination comprising at least one of the foregoing. Antioxidants are used in amounts of 0.01 to 0.1 parts by weight, based on 100 parts by weight of the total composition, excluding any filler.

Coupling agents can improve the adhesion between the antistatic agent (e.g., the conductive carbon black) and the high density polyethylene of the outer layer composition. Exemplary coupling agents can include but are not limited to organosilicon, titanium, and aluminum derivatives such as silanes (e.g., dimethyldichlorosilane, methyl trichlorosilane, vinyl trichlorosilane, γ-methacryl-oxypropyltrimethyoxysilane, N,N-bis (B-hydroxyethyl)γ-amine-propyl-triethoxy silane, vinyl propyl-trimethoxysilane, γ-methacryloxy-propyl-trimethoxy silane, γ-mercaptopropyltrimethoxy silane, vinyl trimethoxy silane, γ-glycidoxy propyl trimethoxysilane, p-(3,4-epoxy-cyclohexyl) ethyl trimethyl silane and vinyl trimethoxyethoxy-silane, and the like, or combinations comprising at least one of the foregoing); titanates (e.g., tetra-isooctyl titanate, isopropyl diisostearyl methacryl titanate, isopropyltriisostearoyl titanate, isopropyl-triacryl titanate, titanium di-(dioctyl pyrophosphate) and especially the so-called hybrid titanates such as isopropyl dimethacryl isostearoyl titanate, and the like; and aluminate and zirconium-aluminate type coupling agents; or combinations comprising at least one of the foregoing). In some embodiments, the coupling agent comprises a titanate coupling agent, an aluminate coupling agent, or a combination comprising at least one of the foregoing.

The outer layer composition comprises the additive in an amount of 0 to 6 parts by weight, or 0.01 to 6 parts by weight, or 0.1 to 6 parts by weight, or 0.5 to 6 parts by weight, based on 100 parts by weight total of the high density polyethylene, the antistatic agent, the flame retardant, and the flame retardant synergist.

Components not described herein a required can be minimized or excluded from the outer layer composition. For example, in some embodiments, the outer layer composition comprises 0 to 2 weight percent of a filler, and in some embodiments the inner layer composition excludes a filler.

In a specific embodiment, the outer layer composition consists of 60 to 92 parts by weight of a high density polyethylene, 2 to 15 parts by weight of an antistatic agent, 5 to 15 parts by weight of a flame retardant, 1 to 4 parts by weight of a flame retardant synergist, and 0 to 6 parts by weight of a stabilizer, lubricant, processing aid, drip retardant, UV blockers, dye, pigment, antioxidant, mineral oil, metal deactivator, coupling agent, or a combination comprising at least one of the foregoing.

In another specific embodiment, the antistatic agent is a conductive carbon black, the flame retardant is decabromodiphenyl oxide, the flame retardant synergist is antimony trioxide, and the outer layer composition comprises 60 to 92 parts by weight of the high density polyethylene, 2 to 15 parts by weight of the antistatic agent, 5 to 15 parts by weight of the flame retardant, 1 to 4 parts by weight of the flame retardant synergist, and 0 to 6 parts by weight of a stabilizer, lubricant, processing aid, drip retardant, UV blockers, dye, pigment, antioxidant, mineral oil, metal deactivator, coupling agent, or a combination comprising at least one of the foregoing.

The inner layer composition, the outer layer composition, or both can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the present compositions can each be prepared by melt-blending the components in a twin-screw extruder at a temperature of 270 to 310° C., specifically 280 to 300° C.

The multilayer water pipe can be prepared by extruding molten inner layer composition through an annular die to provide a single layer piper comprising the inner layer composition. Pipe extrusion can accompany compounding of the composition, or it can be a separate step of intermediate pelletization of the composition. Pipe extrusion can be conduct at a melt temperature 240 to 300° C., specifically 240 to 280° C. The single layer pipe can be coated with the molten outer layer composition to provide the multilayer pipe.

In other embodiments, the multilayer pipe can be made by coextruding an outer layer, annular in cross-section and characterized by a first outer diameter, a first inner diameter and a first wall thickness, wherein the outer layer comprises the outer layer composition as described above; and an inner layer, annular in cross-section and characterized by a second outer diameter less than the first inner diameter, a second inner diameter, and a second wall thickness, wherein the inner layer comprising the inner layer composition as described above. Coextruding can be conducted with a pipe coextruder, operating at a temperature of 230 to 260° C., specifically 235 to 255° C., for the outer layer, and 230 to 260° C., specifically 235 to 255° C., for the inner layer.

In some embodiments, the multilayer water pipe can include one or more intervening layers between the inner layer and the outer layer. In some embodiments, no such intervening layers are present. Stated another way, in some embodiments, an intervening layer can be excluded from the present water pipe (i.e., the inner layer and the outer layer are in contact). If one or more intermediate layers are coextruded with the outer layer and the inner layer, their extrusion temperature will depend on their composition and thermal properties and can be selected by a person skilled in the polymer arts.

In some embodiments, the multilayer water pipe can include an intervening layer that is an adhesive layer between the inner layer and the outer layer. The adhesive layer can comprise, for example, a hot-melt adhesive, for example, styrene block copolymer hot-melt adhesives (e.g., SBS hot-melt adhesive, SIS hot-melt adhesive, and the like), polyurethane (PUR) hot-melt adhesive, ethylene vinyl acetate (EVA) hot-melt adhesive, and the like, or combinations thereof.

Figure 2:
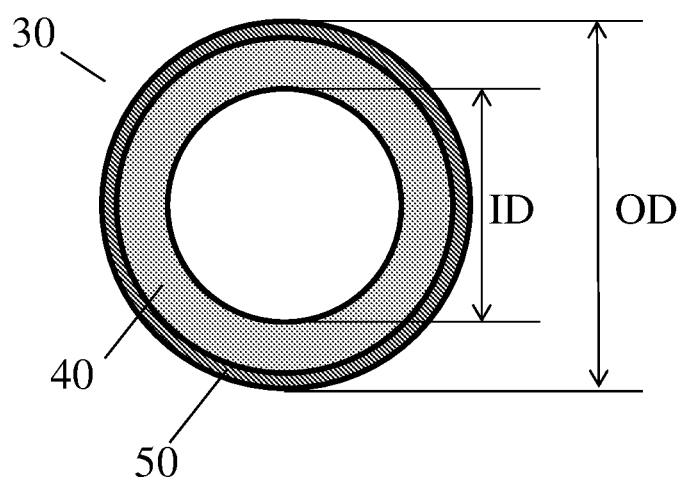
FIG. 2 shows a cross-sectional view of a multilayer pipe 30 for mining operations, having a pipe wall consisting of an inner layer 40 and an outer layer 50.

The multilayer water pipe can have an outer diameter of 20 to 200 millimeters. Within this range, the outer diameter of the pipe can be 20 to 160 millimeters, specifically 40 to 140 millimeters, more specifically 60 to 120 millimeters. The multilayer water pipe can have a total wall thickness of 1.51 to 22 millimeters. The inner layer of the multilayer water pipe has a wall thickness of 1.5 to 20 millimeters. Within this range, the wall thickness can be 1.5 to 15 millimeters, specifically 1.5 to 15 millimeters, more specifically 1.5 to 12 millimeters, or 1.5 to 10 millimeters. The outer layer of the multilayer water pipe has a wall thickness of 0.01 to 2 millimeters. Within this range, the outer layer of the water pipe can have a wall thickness of 0.02 to 1 millimeter, or 0.02 to 0.5 millimeters, or 0.02 to 0.2 millimeters. The water pipe is typically annular in cross-section, but variations in cross-sectional shape are possible. FIG. 1 is a cross-sectional view of a single layer water pipe 10 for mining operations, the pipe wall 20 consisting of the poly (phenylene ether) composition. FIG. 2 shows a cross-sectional view of a multilayer water pipe 30 for mining operations having an inner layer 40 consisting of the poly (phenylene ether) composition, and an outer layer 50 consisting of the flame retardant, antistatic high density polyethylene composition.

The multilayer water pipe of the present disclosure is further illustrated by the following examples, which are non-limiting.

EXAMPLES

Materials used for the following Examples are described in Table 1 below.

TABLE 1

| Component | Description |
|---|---|
| HDPE-1 | High density polyethylene, having a melt flow of about 0.43 grams/10 minutes measured according to ASTM D 1238-13 at 190° C. and 5 kilogram load; provided by SABIC as HDPE P5510 |
| HDPE-2 | Flame retardant, antistatic high density polyethylene composition having a melt flow of about 0.3 grams/10 minutes measured according to ASTM D 1238-13 at 190° C. and 5 kilogram load; provided by Jin Coal Group. |
| PPE | Poly(2,6-dimethyl-1,4-phenylene ether), CAS Reg. No. 24938-67-8, having an intrinsic viscosity of about 0.46 deciliter per gram as measured in chloroform at 25° C.; obtained as PPO 646 from SABIC Innovative Plastics. |
| SEBS G1651 | Polystyrene-poly(ethylene-butylene)-polystyrene triblock copolymer, CAS Reg. No. 66070-58-4, having a polystyrene content of about 30-33 weight percent, essentially no melt flow measured according to ASTM D 1238-13 at 230° C. and 5 kilogram load, and a weight average molecular weight of about 240,000-300,000 daltons; obtained as KRATON ™ G1651 from Kraton Performance Polymers Inc. |
| BPADP | Bisphenol A bis(diphenyl phosphate), CAS Reg. No. 5945-33-5; obtained as CR-741 from Daihachi Chemical Industry Co., Ltd. |
| ZnS | Zinc sulfide, CAS Reg. No. 1314-98-3; obtained as SACHTOLITH ™ HD from Sachtleben Corp. |
| AO 168 | Tris(2,4-di-tert-butylphenyl) phosphite, CAS Reg. No. 31570-04-4; obtained as IRGAFOS ™ 168 from BASF. |

Compositions comprising poly(phenylene ether) were compounded on a Toshiba TEM-37BS twin-screw extruder operating at a throughput of 40 kilograms/hour with zone temperatures of 50° C./150° C./280° C./280° C./280° C./280° C./290° C./290° C./290° C./290° C./290° C. from feed throat to die. All components were added at the feed throat of the extruder. The extrudate as cooled in a water bath and pelletized. Pellets were conditioned at 120° C. 3 hours prior to injection molding or extrusion molding Pipe samples having the dimensions set forth in Table 2 were prepared by profile extrusion with a single screw extruder with an annular die.

In the drop hammer impact test, a 40 joule impact energy is applied to the pipe. A 2 kilogram hammer was dropped from a 2 meter height onto the pipe. To pass the test, the pipe must not crack. In the burst pressure test, water pressure inside the pipe is increased until the pipe cracks. To pass the test, the pipe must withstand a pressure of at least 9 megapascals without cracking. In the static pressure test, 35 megapascals hoop stress is maintained inside the pipe and the hours to failure measured. A value of at least 100 hours is considered passing. (Note that the current requirement for HDPE pipes is 100 hours at only 12.4 megapascals hoop stress.) In the flame retardancy test, a 25 millimeter length of pipe is exposed to a 960° C. flame for 30 seconds before the flame is removed, and the time for the flame to extinguish is measured. A value less than or equal to 10 seconds is considered passing. In the tensile strength and tensile elongation tests, a dumbbell-shaped sample is cut from the pipe and used for determination of tensile properties. A tensile strength of at least 40 megapascals is considered passing, as is a tensile elongation value of at least 10 percent. Outer surface electrical resistance was determined using two electrodes, each being tightly wrapped around the outer surface of the pipe. The distance between the electrodes was 1000 millimeters. Temperature and humidity were controlled to reduce the environmental impact. Results are reported in ohms ($\Omega$). A surface electrical resistance of less than or equal to $10^9$ ohms is considered passing.

Compositions and pipe properties are summarized in Table 2, where component amounts are expressed in parts by weight based on 100 parts by weight total of the poly(phenylene ether), the hydrogenated block copolymer, and the flame retardant.

TABLE 2

|  | C. Ex. 1 | C. Ex. 2 | C. Ex. 3 | C. Ex. 4 Multilayer | | Ex. 1 Multilayer | |
| --- | --- | --- | --- | --- | --- | --- | --- |
| Pipe type | Single layer | Single layer | Single layer | Inner Layer Composition | Outer Layer Composition | Inner layer composition | Outer layer composition |
| COMPOSITIONS | | | | | | | |
| HDPE-1 | 100 | 0 | 0 | 0 | 100 | 0 | 0 |
| HDPE-2 | 0 | 100 | 0 | 0 | 0 | 0 | 100 |
| PPE | 0 | 0 | 75 | 75 | 0 | 75 | 0 |
| SEBS G1651 | 0 | 0 | 12 | 12 | 0 | 12 | 0 |
| BPADP | 0 | 0 | 13 | 13 | 0 | 13 | 0 |
| ZnS | 0 | 0 | 0.13 | 0.13 | 0 | 0.13 | 0 |
| AO 168 | 0 | 0 | 0.09 | 0.09 | 0 | 0.09 | 0 |
| PIPE SPECIFICATIONS | | | | | | | |
| Pipe outer diameter (mm) | 25 | 25 | 25 | 25 | | 25 | |
| Total pipe wall thickness (mm) | 2.7 | 2.7 | 2.7 | 2.7 | | 2.7 | |
| Inner layer wall thickness (mm) | — | — | — | 2.5 | | 2.5 | |
| Outer layer wall thickness (mm) | — | — | — | 0.2 | | 0.2 | |
| PIPE PROPERTIES | | | | | | | |
| Outer surface electrical resistance ($\Omega$/mm$^2$) | >$10^{16}$ | <$10^9$ | >$10^{16}$ | >$10^{16}$ | | $2.5 \times 10^4$ | |
| Drop hammer impact | Passed | Passed | Passed | Passed | | Passed | |
| Burst pressure | Failed | Failed | Passed | Passed | | Passed | |
| Static pressure failure time, (hours) | Failed | Failed | Passed | Passed | | Passed | |

TABLE 2-continued

|  | C. Ex. 1 | C. Ex. 2 | C. Ex. 3 | C. Ex. 4 Multilayer | | Ex. 1 Multilayer | |
|---|---|---|---|---|---|---|---|
| Pipe type | Single layer | Single layer | Single layer | Inner Layer Composition | Outer Layer Composition | Inner layer composition | Outer layer composition |
| Tensile strength (MPa) | <20 | <20 | 53 | 53 | | 53 | |
| Tensile elongation (%) | — | — | 50 | 50 | | 50 | |

The results in Table 2 show that each of Comparative Examples 1 through 3, which are each single layer pipes, exhibit an acceptable balance of pipe properties including drop hammer impact strength, burst pressure resistance, static pressure resistance, tensile strength, and outer surface electrical resistance. Specifically, Comparative Examples 1 and 2 were deficient in burst pressure resistance, static pressure resistance, and tensile strength. Comparative Example 3 exhibited acceptable drop hammer impact strength, burst pressure resistance, static pressure resistance, and tensile strength, but was deficient in outer surface electrical resistance. Comparative Example 4, a multilayer pipe having an outer layer consisting of high density polyethylene, exhibited acceptable drop hammer impact strength, burst pressure resistance, static pressure resistance, and tensile strength, but was deficient in outer surface electrical resistance. In contrast, Example 1 exhibited a desirable balance of pipe properties including drop hammer impact strength, burst pressure resistance, static pressure resistance, tensile strength, and outer surface electrical resistance.

This disclosure further encompasses the following non-limiting embodiments.

Embodiment 1

A multilayer water pipe for mining operations having an inner layer and an outer layer, wherein the inner layer comprises an inner layer composition comprising: 58 to 82 parts by weight poly(phenylene ether), 8 to 18 parts by weight of a hydrogenated block copolymer of an alkenyl aromatic monomer and a conjugated diene, 0 to 15 parts by weight of a homopolystyrene, rubber-modified polystyrene, or a combination comprising at least one of the foregoing, and 10 to 20 parts by weight of a flame retardant comprising an organophosphate ester, wherein parts by weight values of the inner layer composition are based on 100 parts by weight total of the poly(phenylene ether), the hydrogenated block copolymer, the polystyrene, and the flame retardant, and the outer layer comprises an outer layer composition comprising: 60 to 92 parts by weight of a high density polyethylene; 2 to 15 parts by weight of an antistatic agent; 5 to 15 parts by weight of a flame retardant; and 1 to 4 parts by weight of a flame retardant synergist; wherein parts by weight values of the outer layers composition are based on 100 parts by weight total of the high density polyethylene, the antistatic agent, the flame retardant, and the flame retardant synergist.

Embodiment 2

The multilayer water pipe of embodiment 1, wherein the poly(phenylene ether) comprises a poly(2,6-dimethyl-1,4-phenylene ether) having an intrinsic viscosity of 0.3 to 0.6 deciliter per gram, determined by Ubbelohde viscometer at 25° C. in chloroform.

Embodiment 3

The multilayer water pipe of any one or more of embodiments 1 to 2, wherein the hydrogenated block copolymer is a polystyrene-poly(ethylene-propylene)-polystyrene triblock copolymer having a polystyrene content of 20 to 45 weight percent, based on the weight of the polystyrene-poly (ethylene-propylene)-polystyrene triblock copolymer.

Embodiment 4

The multilayer water pipe of embodiment 3, wherein the polystyrene-poly(ethylene-propylene)-polystyrene triblock copolymer has a weight average molecular weight of 240,000 to 300,000 Daltons, determined by size exclusion chromatography using polystyrene standards.

Embodiment 5

The multilayer water pipe of any one or more of embodiments 1 to 4, wherein the polystyrene consists of the homopolystyrene.

Embodiment 6

The multilayer water pipe of any one or more of embodiments 1 to 4, wherein the polystyrene consists of the rubber-modified polystyrene.

Embodiment 7

The multilayer water pipe of any one or more of embodiments 1 to 4, wherein the inner layer composition excludes polystyrene.

Embodiment 8

The multilayer water pipe of any one or more of embodiments 1 to 7, wherein the flame retardant of the inner layer composition consists of the organophosphate ester.

Embodiment 9

The multilayer water pipe of any one or more of embodiments 1 to 8, wherein the organophosphate ester comprises bisphenol A bis(diphenyl phosphate).

Embodiment 10

The multilayer water pipe of embodiment 1, wherein the inner layer composition consists of: 58 to 82 parts by weight poly(phenylene ether), 8 to 18 parts by weight of the hydrogenated block copolymer, 0 to 15 parts by weight of a homopolystyrene, rubber-modified polystyrene, or a combination comprising at least one of the foregoing, 10 to 20 parts by weight of the flame retardant, and 0 to 5 parts by weight of a stabilizer, lubricant, processing aid, drip retardant, UV blocker, dye, pigment, antioxidant, anti-static agent, mineral oil, metal deactivator, or a combination comprising at least one of the foregoing.

Embodiment 11

The multilayer water pipe of any one or more of embodiments 1 to 10, wherein the antistatic agent of the outer layer composition comprises conductive carbon black, carbon nanotubes, or a combination comprising at least one of the foregoing, preferably conductive carbon black.

Embodiment 12

The multilayer water pipe of any one or more of embodiments 1 to 11, wherein the flame retardant of the outer layer composition comprises a halogenated flame retardant, preferably a brominated flame retardant, more preferably decabromodiphenyl oxide, tetrabromophthalate esters, tetrabromobenzoate esters, tetrabromobisphenol A, tetrabromobisphenol A ethers, poly(dibromostyrene), hexabromocyclodecane, decabromodiphenylethane, 2,4,6-tribromophenol, bis(2,4,6-tribromophenoxy)ethane, or a combination comprising at least one of the foregoing.

Embodiment 13

The multilayer water pipe of any one or more of embodiments 1 to 12, wherein the flame retardant synergist of the outer layer composition comprises antimony trioxide.

Embodiment 14

The multilayer water pipe of any one or more of embodiments 1 to 13, wherein the outer layer composition further comprises 0.5 to 6 parts by weight of a stabilizer, lubricant, processing aid, drip retardant, UV blocker, dye, pigment, antioxidant, mineral oil, metal deactivator, coupling agent, or a combination comprising at least one of the foregoing, preferably an antioxidant and a coupling agent.

Embodiment 15

The multilayer water pipe of any one or more of embodiments 1 to 14, wherein the multilayer water pipe has an outer diameter of 20 to 200 millimeters and a total wall thickness of 1.51 to 22 millimeters, preferably 2 to 20 millimeters.

Embodiment 16

The multilayer water pipe of any one or more of embodiments 1 to 15, wherein the inner layer has a wall thickness of 1.5 to 20 millimeters and the outer layer has a wall thickness of 0.01 to 2 millimeters, preferably wherein the inner layer has a wall thickness of 1.5 to 10 millimeters and the outer layer has a wall thickness of 0.02 to 0.2 millimeters.

Embodiment 17

The multilayer water pipe of any one or more of embodiments 1 to 16, further comprising an adhesive layer between the inner layer and the outer layer.

Embodiment 18

A multilayer water pipe for mining operations having an inner layer and an outer layer, wherein the multilayer water pipe has an outer diameter of 20 to 200 millimeters and a total wall thickness of 1.51 to 22 millimeters; the inner layer has a wall thickness of 1.5 to 20 millimeters and the outer layer has a wall thickness of 0.01 to 2 millimeters, preferably wherein the inner layer has a wall thickness of 1.5 to 10 millimeters and the outer layer has a wall thickness of 0.02 to 0.2 millimeters; the inner layer comprises an inner layer composition comprising: 58 to 82 parts by weight, preferably 65 to 75 parts by weight poly(phenylene ether), 8 to 18 parts by weight, preferably 12 to 16 parts by weight of a hydrogenated block copolymer of an alkenyl aromatic monomer and a conjugated diene, 0 to 15 parts by weight, preferably 1 to 15 parts by weight of a homopolystyrene, rubber-modified polystyrene, or a combination comprising at least one of the foregoing, and 10 to 20 parts by weight of a flame retardant comprising an organophosphate ester, wherein parts by weight values of the inner layer composition are based on 100 parts by weight total of the poly (phenylene ether), the hydrogenated block copolymer, the polystyrene, and the flame retardant, and the outer layer comprises an outer layer composition comprising: 60 to 92 parts by weight of a high density polyethylene; 2 to 15 parts by weight of an antistatic agent; 5 to 15 parts by weight of a flame retardant; and 1 to 4 parts by weight of a flame retardant synergist; wherein parts by weight values of the outer layers composition are based on 100 parts by weight total of the high density polyethylene, the antistatic agent, the flame retardant, and the flame retardant synergist.

Embodiment 19

A method of manufacturing the multilayer water pipe of any one or more of embodiments 1 to 18, the method comprising: forming an inner layer composition by melt-mixing 58 to 82 parts by weight poly(phenylene ether), 8 to 18 parts by weight of a hydrogenated block copolymer of an alkenyl aromatic monomer and a conjugated diene, 0 to 15 parts by weight of a homopolystyrene, a rubber-modified polystyrene, or a combination comprising at least one of the foregoing, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant; extruding the composition through an annular die to provide a single layer pipe comprising the inner layer composition; forming an outer layer composition by melt-mixing 60 to 92 parts by weight of a high density polyethylene; 2 to 15 parts by weight of an antistatic agent; 5 to 15 parts by weight of a flame retardant; and 1 to 4 parts by weight of a flame retardant synergist; wherein parts by weight values of the outer layers composition are based on 100 parts by weight total of the high density polyethylene, the antistatic agent, the flame retardant, and the flame retardant synergist; and coating the single layer pipe with the outer layer composition to provide the multilayer pipe.

Embodiment 20

A method of manufacturing the multilayer water pipe of any one or more of embodiments 1 to 18, the method comprising: coextruding an outer layer, annular in cross-section and characterized by a first outer diameter, a first inner diameter and a first wall thickness; wherein the outer layer comprises an outer layer composition comprising, based on 100 parts by weight total of the high density polyethylene, the antistatic agent, the flame retardant, and the flame retardant synergist, 60 to 92 parts by weight of a high density polyethylene; 2 to 15 parts by weight of an antistatic agent; 5 to 15 parts by weight of a flame retardant; and 1 to 4 parts by weight of a flame retardant synergist; and an inner layer, annular in cross-section and characterized by a second outer diameter less than the first inner diameter, a second inner diameter, and a second wall thickness; wherein the inner layer comprises an inner layer composition comprising, based on 100 parts by weight total of the poly(phenylene ether), the hydrogenated block copolymer, the polystyrene, and the flame retardant, 58 to 82 parts by weight poly(phenylene ether); 8 to 18 parts by weight of a hydrogenated block copolymer of an alkenyl aromatic monomer and a conjugated diene; 0 to 15 parts by weight of a homopolystyrene, a rubber-modified polystyrene or a combination comprising at least one of the foregoing; and 10 to 20 parts by weight of a flame retardant comprising an organophosphate ester.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($-HC=CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($-CH_2-$) or, propylene ($-(CH_2)_3-$)). "Cycloalkylene" means a divalent cyclic alkylene group, $-C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro ($-NO_2$), a cyano ($-CN$), a $C_{1-6}$ alkyl sulfonyl ($-S(=O)_2$-alkyl), a $C_{6-12}$ aryl sulfonyl ($-S(=O)_2$-aryl) a thiol ($-SH$), a thiocyano ($-SCN$), a tosyl ($CH_3C_6H_4SO_2-$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $-CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A multilayer water pipe for mining operations having an inner layer and an outer layer, wherein
   the inner layer comprises an inner layer composition comprising:
      58 to 82 parts by weight poly(phenylene ether),
      8 to 18 parts by weight of a hydrogenated block copolymer of an alkenyl aromatic monomer and a conjugated diene,
      0 to 15 parts by weight of a homopolystyrene, a rubber-modified polystyrene, or a combination comprising at least one of the foregoing, and
      10 to 20 parts by weight of a flame retardant comprising an organophosphate ester,
   wherein parts by weight values of the inner layer composition are based on 100 parts by weight total of the poly(phenylene ether), the hydrogenated block copolymer, the polystyrene, and the flame retardant, and
   the outer layer comprises an outer layer composition comprising:

60 to 92 parts by weight of a high density polyethylene;

2 to 15 parts by weight of an antistatic agent;

5 to 15 parts by weight of a flame retardant; and 1 to 4 parts by weight of a flame retardant synergist;

wherein parts by weight values of the outer layer composition are based on 100 parts by weight total of the high density polyethylene, the antistatic agent, the flame retardant, and the flame retardant synergist.

2. The multilayer water pipe of claim 1, wherein the poly(phenylene ether) comprises a poly(2,6-dimethyl-1,4-phenylene ether) having an intrinsic viscosity of 0.3 to 0.6 deciliter per gram, determined by Ubbelohde viscometer at 25° C. in chloroform.

3. The multilayer water pipe of claim 1, wherein the hydrogenated block copolymer is a polystyrene-poly(ethylene-propylene)-polystyrene triblock copolymer having a polystyrene content of 20 to 45 weight percent, based on the weight of the polystyrene-poly(ethylene-propylene)-polystyrene triblock copolymer.

4. The multilayer water pipe of claim 3, wherein the polystyrene-poly(ethylene-propylene)-polystyrene triblock copolymer has a weight average molecular weight of 240,000 to 300,000 Daltons, determined by size exclusion chromatography using polystyrene standards.

5. The multilayer water pipe of claim 1, wherein the polystyrene consists of the homopolystyrene.

6. The multilayer water pipe of claim 1, wherein the polystyrene consists of the rubber-modified polystyrene.

7. The multilayer water pipe of claim 1, wherein the inner layer composition excludes polystyrene.

8. The multilayer water pipe of claim 1, wherein the flame retardant of the inner layer composition consists of the organophosphate ester.

9. The multilayer water pipe of claim 1, wherein the organophosphate ester comprises bisphenol A bis(diphenyl phosphate).

10. The multilayer water pipe of claim 1, wherein the inner layer composition consists of:

58 to 82 parts by weight poly(phenylene ether), 8 to 18 parts by weight of the hydrogenated block copolymer, 0 to 15 parts by weight of the homopolystyrene, rubber-modified polystyrene, or combination comprising at least one of the foregoing, 10 to 20 parts by weight of the flame retardant, and 0 to 5 parts by weight of a stabilizer, lubricant, processing aid, drip retardant, UV blocker, dye, pigment, antioxidant, anti-static agent, mineral oil, metal deactivator, or a combination comprising at least one of the foregoing.

11. The multilayer water pipe of claim 1, wherein the antistatic agent of the outer layer composition comprises conductive carbon black, carbon nanotubes, or a combination comprising at least one of the foregoing.

12. The multilayer water pipe of claim 1, wherein the flame retardant of the outer layer composition comprises a halogenated flame retardant.

13. The multilayer water pipe of claim 1, wherein the flame retardant synergist of the outer layer composition comprises antimony trioxide.

14. The multilayer water pipe of claim 1, wherein the outer layer composition further comprises 0.5 to 6 parts by weight of a stabilizer, lubricant, processing aid, drip retardant, UV blocker, dye, pigment, antioxidant, mineral oil, metal deactivator, or a combination comprising at least one of the foregoing.

15. The multilayer water pipe of claim 1, wherein the multilayer water pipe has an outer diameter of 20 to 200 millimeters and a total wall thickness of 1.51 to 22 millimeters.

16. The multilayer water pipe of claim 1, wherein the inner layer has a wall thickness of 1.5 to 20 millimeters and the outer layer has a wall thickness of 0.01 to 2 millimeters.

17. The multilayer water pipe of claim 1, further comprising an adhesive layer between the inner layer and the outer layer.

18. A multilayer water pipe for mining operations having an inner layer and an outer layer, wherein the multilayer water pipe has an outer diameter of 20 to 200 millimeters and a total wall thickness of 1.51 to 22 millimeters;

the inner layer has a wall thickness of 1.5 to 20 millimeters and the outer layer has a wall thickness of 0.01 to 2 millimeters;

the inner layer comprises an inner layer composition comprising:

58 to 82 parts by weight poly(phenylene ether), 8 to 18 parts by weight of a hydrogenated block copolymer of an alkenyl aromatic monomer and a conjugated diene, 0 to 15 parts by weight of a homopolystyrene, rubber-modified polystyrene, or a combination comprising at least one of the foregoing, and 10 to 20 parts by weight of a flame retardant comprising an organophosphate ester, wherein parts by weight values of the inner layer composition are based on 100 parts by weight total of the poly(phenylene ether), the hydrogenated block copolymer, the polystyrene, and the flame retardant, and the outer layer comprises an outer layer composition comprising:

60 to 92 parts by weight of a high density polyethylene;

2 to 15 parts by weight of an antistatic agent;

5 to 15 parts by weight of a flame retardant; and 1 to 4 parts by weight of a flame retardant synergist;

wherein parts by weight values of the outer layer composition are based on 100 parts by weight total of the high density polyethylene, the antistatic agent, the flame retardant, and the flame retardant synergist.

19. A method of manufacturing the multilayer water pipe of claim 1, the method comprising:

forming the inner layer composition by melt-mixing 58 to 82 parts by weight poly(phenylene ether), 8 to 18 parts by weight of the hydrogenated block copolymer of an alkenyl aromatic monomer and a conjugated diene, 0 to 15 parts by weight of the homopolystyrene, rubber-modified polystyrene, or a combination comprising at least one of the foregoing, and 10 to 20 parts by weight of the flame retardant comprising an organophosphate ester, wherein parts by weight values are based on 100 parts by weight total of the poly(phenylene ether), the hydrogenated block copolymer, the polystyrene, and the flame retardant;

extruding the composition through an annular die to provide a single layer pipe comprising the inner layer composition;

forming the outer layer composition by melt-mixing
60 to 92 parts by weight of the high density polyethylene;
2 to 15 parts by weight of the antistatic agent;
5 to 15 parts by weight of the flame retardant; and
1 to 4 parts by weight of the flame retardant synergist;
wherein parts by weight values of the outer layer composition are based on 100 parts by weight total of the high density polyethylene, the antistatic agent, the flame retardant, and the flame retardant synergist; and
coating the single layer pipe with the outer layer composition to provide the multilayer pipe.

20. A method of manufacturing the multilayer water pipe of claim 1, the method comprising:
coextruding
the outer layer, annular in cross-section and characterized by a first outer diameter, a first inner diameter and a first wall thickness; wherein the outer layer comprises the outer layer composition comprising, based on 100 parts by weight total of the high density polyethylene, the antistatic agent, the flame retardant, and the flame retardant synergist, 60 to 92 parts by weight of the high density polyethylene; 2 to 15 parts by weight of the antistatic agent; 5 to 15 parts by weight of the flame retardant; and 1 to 4 parts by weight of the flame retardant synergist; and the inner layer, annular in cross-section and characterized by a second outer diameter less than the first inner diameter, a second inner diameter, and a second wall thickness; wherein the inner layer comprises the inner layer composition comprising, based on 100 parts by weight total of the poly(phenylene ether), the hydrogenated block copolymer, the polystyrene, and the flame retardant, 58 to 82 parts by weight poly(phenylene ether); 8 to 18 parts by weight of the hydrogenated block copolymer of an alkenyl aromatic monomer and a conjugated diene; 0 to 15 parts by weight of the homopolystyrene, rubber-modified polystyrene, or a combination comprising at least one of the foregoing; and 10 to 20 parts by weight of the flame retardant comprising an organophosphate ester.

* * * * *